United States Patent
Wiser

(10) Patent No.: US 6,805,384 B1
(45) Date of Patent: Oct. 19, 2004

(54) SEALING MECHANISM

(75) Inventor: Herman D. Wiser, Buda, TX (US)

(73) Assignee: Chatleff Controls, Inc., Buda, TX (US)

( * ) Notice: Subject to any disclaimer, the term of this patent is extended or adjusted under 35 U.S.C. 154(b) by 0 days.

(21) Appl. No.: 10/218,360

(22) Filed: Aug. 14, 2002

(51) Int. Cl.[7] .............................................. F16L 19/00
(52) U.S. Cl. ..................... 285/354; 285/382.2; 285/386
(58) Field of Search ............................. 285/354, 382.1, 285/382.2, 382.4, 382.7, 386

(56) References Cited

U.S. PATENT DOCUMENTS

| | | | | |
|---|---|---|---|---|
| 1,504,363 A | * | 8/1924 | Madigan | 285/330 |
| 1,906,826 A | * | 5/1933 | Smith et al. | 285/354 |
| 2,305,668 A | * | 12/1942 | Bruno | 285/331 |
| 2,330,864 A | * | 10/1943 | Bruno | 285/354 |
| 2,726,104 A | * | 12/1955 | Boitnott et al. | 285/354 |
| 4,805,944 A | * | 2/1989 | Reginaldo | 285/354 |
| 5,131,695 A | | 7/1992 | Wiser | 285/354 |
| 5,131,695 A | | 1/1994 | Wiser | 285/354 |
| 5,553,902 A | * | 9/1996 | Powers | 285/354 |
| 5,695,225 A | | 12/1997 | Grenga | 285/150 |
| 5,894,741 A | | 4/1999 | Durham et al. | 65/525 |

OTHER PUBLICATIONS

"Chatleff Controls, Inc.: Valves & Fittings," Chatleff Controls, Inc., Rev: Mar. 6–14, 1996; pp. 39–42 and 45–52.

* cited by examiner

Primary Examiner—David Bochna
(74) Attorney, Agent, or Firm—Trop, Pruner & Hu, P.C.

(57) ABSTRACT

An apparatus includes a body, an adapter and a seal ring. The apparatus may be coupled to provide a seal that has a primary metal to metal seal and a secondary seal obtained via extrusion of the seal ring.

19 Claims, 7 Drawing Sheets

SEALING MECHANISM

BACKGROUND

1. Field of the Invention

The invention provides an improved connection for sealably joining two members. More particularly, the invention relates to a leakproof union coupling, which may be used, for example, in a refrigeration system.

2. Description of the Prior Art

Refrigeration systems typically include several components, such as compressors, condensers, heat exchangers, and valves, which must be connected together in a way that effectively seals the interior of the refrigerant circulating system from the environment around it. Refrigerants, such as Freon, which are introduced into such systems as the working fluid, are expensive, hazardous to the environment, and sometimes toxic, and it is therefore critical that a closed circulating system be effectively sealed to prevent escape of the fluid or gas.

Sealing of a refrigeration system is often complicated by the fact that various portions of the system are simultaneously hot and cold, and may be operated under a high pressure and a vacuum, and vibration is often a factor. Also, the common refrigerant fluids may be incompatible with many common sealing materials, and specialized materials such as polytetrafluoroethylene (TEFLON) must be used.

It is often desirable that a connection between two components of a refrigeration system be easily disconnected, so that installation and replacement of a component may be accomplished without the use of heat connecting methods or extensive tools. It is also desirable that the connection be accomplished by abutting the ends of two fixed conduits and sealably joining them, without rotating either conduit. Connections known as "unions" are common in plumbing and other pipefitting arts, which employ a rotatable nut or collar to connect abutting ends of conduits, where the ends have been previously fitted with appropriate hardware. The typical union may be repeatedly connected and disconnected by rotating the collar.

As described in U.S. Pat. No. 5,131,695, commonly assigned with the present application, the disclosure of which is hereby incorporated by reference, one manner of joining conduits is by providing a variable width seal within the union. Such seal includes a washer disposed between two metal portions of the union so that the two metal portions do not contact each other in normal usage. That is, the compressed washer is the primary sealing mechanism, and such seal may be backed up by metal on metal contact only on failure of the compressed washer. While this arrangement is generally suitable, several potential problems exist.

First, the compressed washer is manufactured preferably from TEFLON, and more preferably glass filled TEFLON. The washer tends to suffer from relaxation of tension with time due to cold flow of the seal material. Second, the secondary metal on metal seat is purely compressive in nature, and allows for some small degree of leakage if one or both of the metal parts are damaged during handling. Further, if the compression is insufficient to fill any gaps in the metal, a small but detectable leak can result. If such a leak were to develop, the union may require disassembly and possible replacement, a process that may involve loss of refrigerant and increased costs. Thus a need exists for a more robust sealing mechanism for a union or coupling.

SUMMARY OF THE INVENTION

In one embodiment, the present invention is an apparatus having a body with first and second ends, one of which has an annular protrusion extending therefrom. The apparatus further has an adapter with an axial groove dimensioned so that an outward edge of the groove contacts the annular protrusion of the body while the body is coupled to the adapter. A seal ring is disposed within the axial groove. In operation, the apparatus may be coupled, such as by a tensioner, so that a metal to metal seal is made between the body and the adapter that acts as a primary seal, while the seal ring, portions of which may be extruded out of the axial groove, acts as a secondary seal.

DETAILED DESCRIPTION

Figure 1:
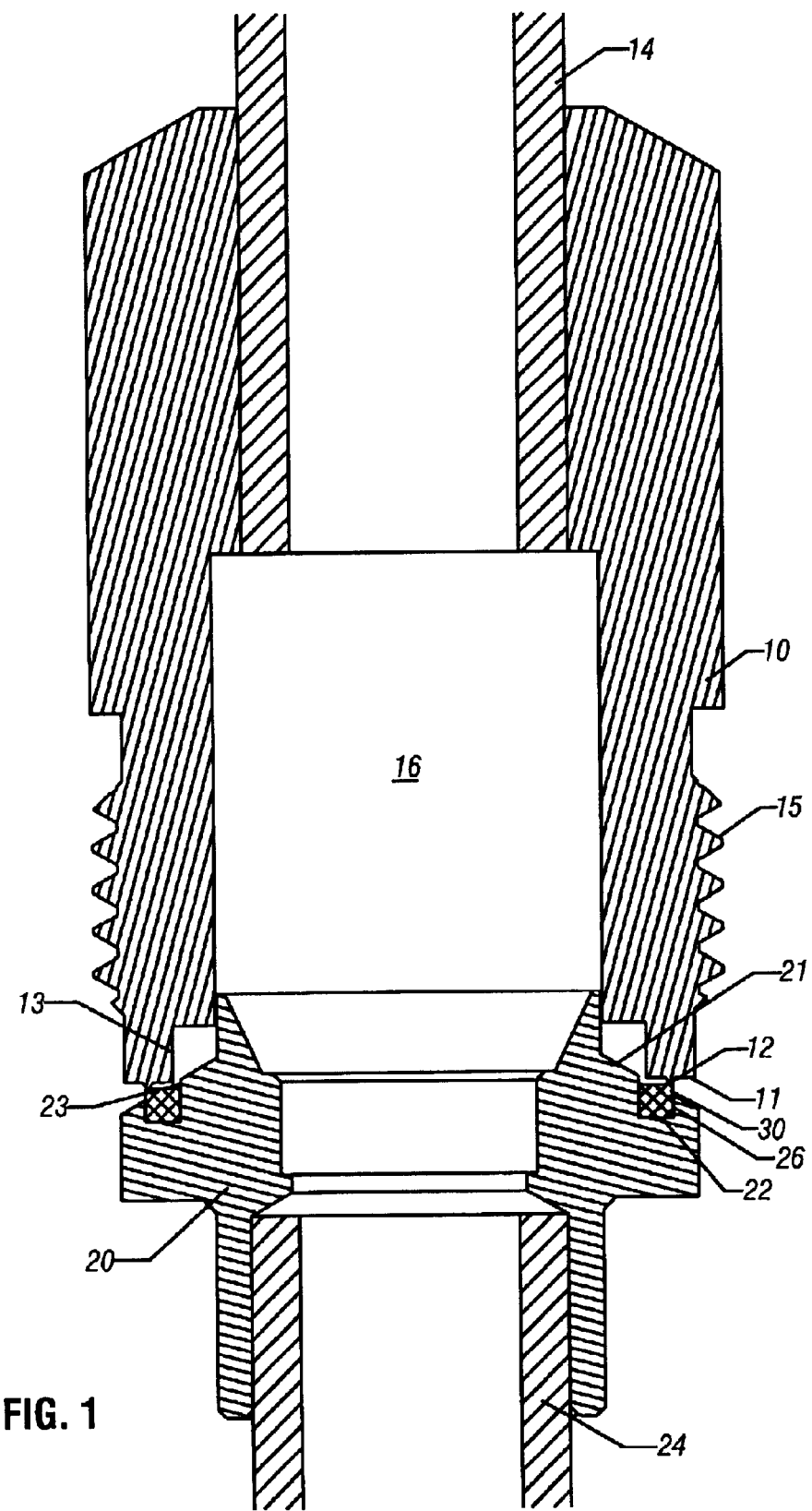
FIG. 1 is a cross-sectional view of a coupling in accordance with one embodiment of the present invention.

Referring now to FIG. 1, elements of a reusable coupling in accordance with one embodiment of the present invention include body 10, adapter 20, and seal ring 30, which are to be coupled together removably and sealably. FIG. 1 shows these elements at the beginning of a joining sequence and without a tensioning mechanism, such as a nut, for joining the elements together.

It is to be understood that embodiments of the present invention may be used to join together a pair of conduits 14 and 24, as shown in FIG. 1. Such conduits are typically generally cylindrical, thin wall conduits, but any fluid carrying conduits may be joined with the present invention. Conduits 14 and 24 may be positioned substantially parallel and coaxial with respect to one another for connecting. The first end (shown in FIG. 1 at the top of the page) of body 10 may be permanently fitted to the end of first conduit 14, while adapter 20 may be permanently fitted to the end of second conduit 24. This fitting may be accomplished in both cases by inserting the respective conduits into the body and the adapter and soldering or brazing them in place. Alternatively, the body and adapter may be joined to the respective conduits in any other conventional manner, for example, such as threading.

Body 10 or adapter 20 may of course be connected directly to a vessel or apparatus rather than to a conduit. Similarly, body 10, rather than being adapted to be connected to a conduit, may be constructed as a cap (having channel 16 open only at the second (i.e., lower) end of body 10), a spray nozzle, a distribution junction, or any other desired device. In other embodiments the top end of body 10

(for example, the angled portions) may be fitted with a plurality of holes to which tubes may be connected, such as used in a distributor for a refrigeration system or the like.

Body 10 has a generally cylindrical central channel 16 through which fluid can pass during operation of the coupling. In certain embodiments, a piston or similar flow control device may be positioned within the coupling (e.g., in channel 16) to regulate flow therethrough. Extending from the mating (i.e. lower) end of body 10 is mating surface 11, from which extends annulus 12. While shown in FIG. 1 (and following figures) as a generally frustoconical point it is to be understood that in other embodiments, annulus 12 may be more or less sharply pointed, triangular, rounded, semi-circular, or otherwise shaped. The mating end of body 10 also includes an internal annular wall 13.

As shown in FIG. 1, adapter 20 includes an axial groove 22 within mating surface 21 having an inner edge 23 and an outer edge 26. While shown as being angular, it is to be understood that in other embodiments, mating surface 21 may be flat, multi-angled, or otherwise shaped.

Preferably, groove 22 is dimensioned to retain the seal ring 30 prior to the joining operation. Further, groove 22 is dimensioned so that during the joining operation (as discussed further below), annulus 12 contacts outer edge 26 of groove 22.

In certain embodiments, the seal ring 30 may be sized so that its diameter in relaxation is slightly smaller than the diameter of axial groove 22. In such manner, seal ring 30 may be placed within groove 22 and will remain affixed therein unless intentionally removed, thus avoiding the accidental loss of seal ring 30 prior to its use. Thus seal ring 30 may be placed within groove 22 after manufacture of adapter 20 and may be reliably shipped and used without accidental loss.

In various embodiments, seal ring 30 may be constructed of any suitable material. In a preferred embodiment for refrigeration service a polymer, such as polytetrafluoroethylene (TEFLON), is preferred due to its high temperature resistance and its resistance to many refrigerants and oils. In one embodiment, virgin TEFLON may be used. In addition to being less expensive than other TEFLON formulations, such as glass filled TEFLON, virgin TEFLON is subject to relaxation of tension over time due to cold flow of the seal material. Other TEFLON formulations, such as glass filled TEFLON, seek to minimize such relaxation. As will be discussed below, embodiments of the present invention using virgin TEFLON take advantage of the cold flow characteristics to create a more robust seal.

Figure 2:
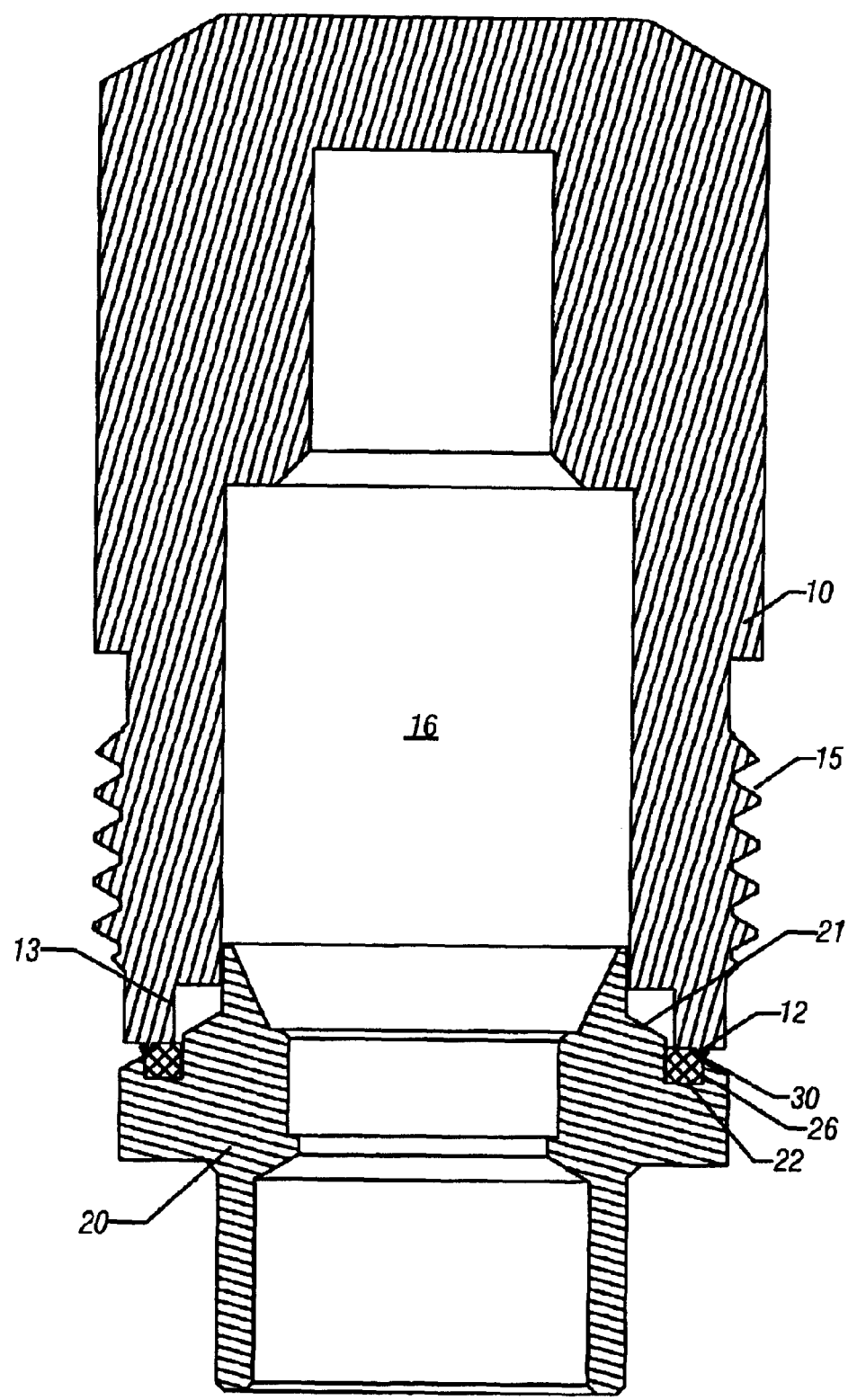
FIG. 2 is a cross-sectional view of another coupling in accordance with another embodiment of the present invention.

Referring now to FIG. 2, shown is a cross-section of a coupling in accordance with one embodiment of the present invention at the start of the compression phase of the joining operation. Note in the embodiment of FIG. 2, body 10 terminates in a cap, that is, no conduit extends therefrom. Further, for ease of reference, adapter 20 is shown without a conduit extending therefrom. While not shown in FIG. 2, it is to be understood that the joining may be effected by tightening a tensioner such as a nut or collar, positioned around the adapter 20 and mating with the external threads 15 of body 10.

At the start of compression, annulus 12 imbeds itself in the face of seal ring 30, which begins to deform to fill groove 22 tightly. As shown in FIG. 2, the deformed portion of seal ring 30 begins to escape over the outer edge 26 of groove 22.

Figure 3:
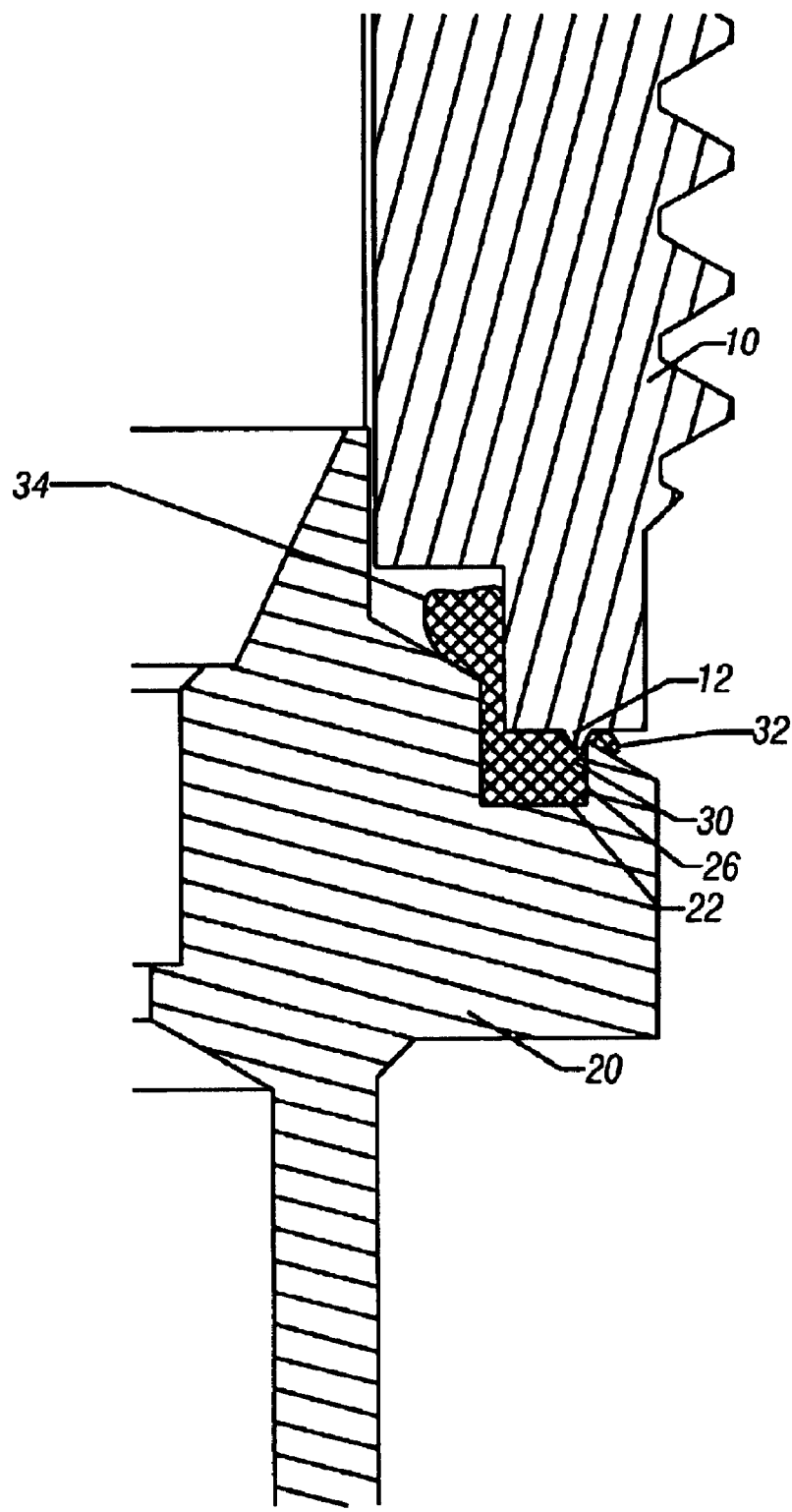
FIG. 3 is an enlarged cross-sectional view illustrating the sealing portion of the embodiment of FIG. 2.

FIG. 3 shows an enlarged cross-section of the seating joint of the coupling during a further portion of the compression phase of the joining operation. As shown in FIG. 3, seal ring 30 cold flows axially in both directions as more tension is placed on the coupling by tightening of the tensioner (not shown in FIG. 3). TEFLON does not cold flow until a certain amount of force is applied. This force is retained when the cold flow stops (in the form of hysteresis). As the joint is tightened, a metal to metal seat is formed as annulus 12 contacts the outer edge 26 of groove 22 and the two surfaces slide along each other, deforming the annuli (i.e., annulus 12 and edge 26) and forming a seal. During this movement, seal ring 30 becomes a backup seal to this metal to metal seal.

When contact between annulus 12 and edge 26 is made, any imperfections in the two metal surfaces are filled with a layer of seal ring 30 being extruded through the opening. Such imperfections may occur if the primary metal seal were to become damaged during changing of a piston within the coupling or during normal setup procedures, for example. The configuration of this seal thus takes advantage of the cold flow characteristics of TEFLON to retain a backup seal at a substantially fixed tension.

The metal on metal seal engages two metal surfaces (i.e., annulus 12 and edge 26) in such a way as to cause a sliding motion combined with compression to inherently smooth out any surface damage to the mating surfaces and remove any surface contaminants from the joint. Thus, the metal on metal seal is a sliding seal as well as a compressive seal. The metal on metal seal has two compressive annuli working against each other to roughly double the amount of gasket-like seal material being displaced. Specifically, as the two metal surfaces are brought together during compression, portions of seal ring 30 are extruded into the gap between the two metal surfaces as first extrusion 32 and second extrusion 34. Seal ring 30 is displaced by the two surfaces as they contact each other (through cold flow), except where small gaps may have been caused by surface damage. In such instances, seal ring 30 acts to fill any gaps in the seal that are not filled by metal compression. The small strings of extruded material, being a polymer, maintain a connection to the larger portion of seal ring 30, anchoring the strings against blowout due to pressure behind the seal. Of course, the pressure likely will never get to the metal to metal seal because seal ring 30 is also extruded in the opposite direction to form a seal (i.e., second extrusion 34) behind the primary external metal/polymer seal (i.e., first extrusion 32).

Figure 4:
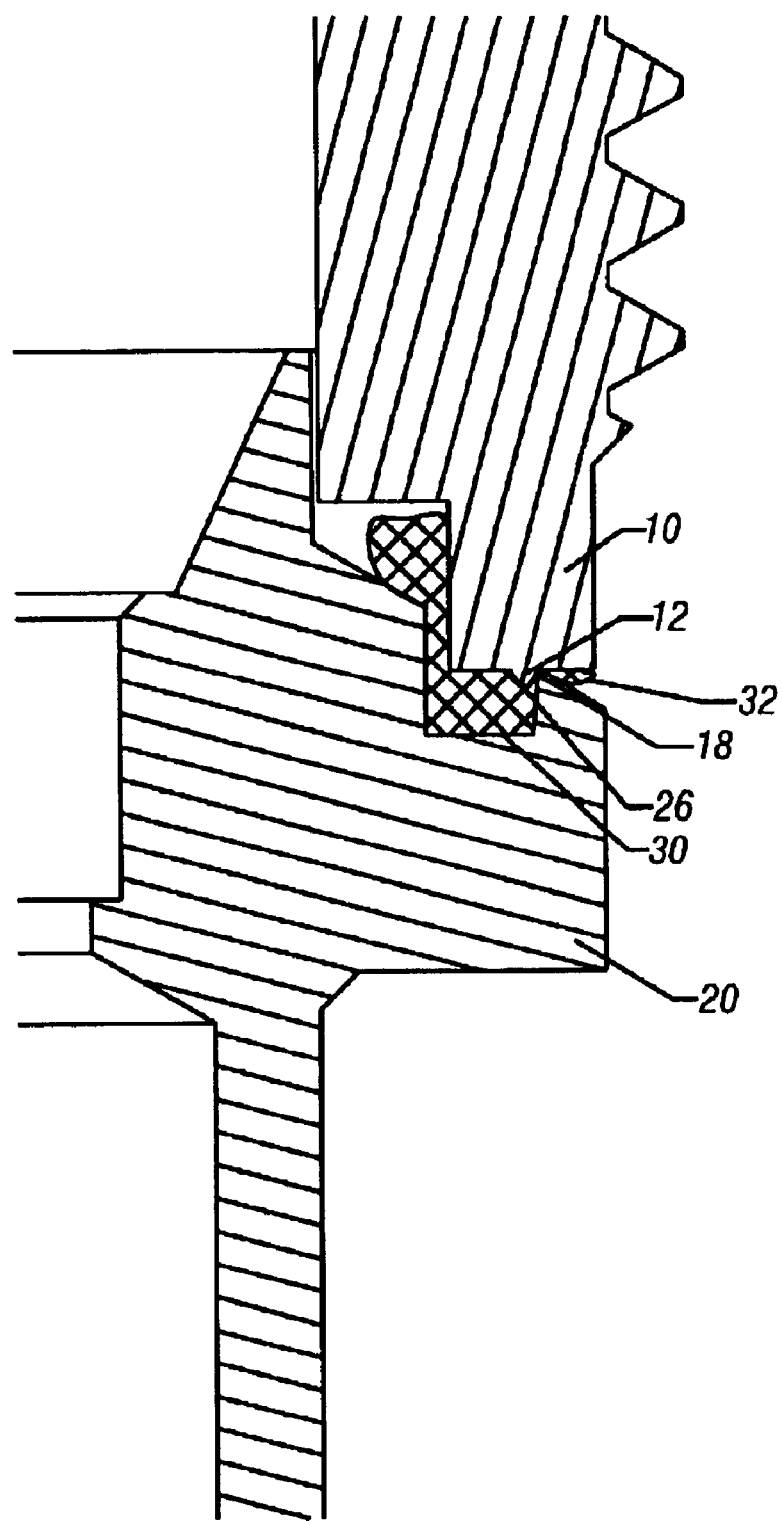
FIG. 4 is an enlarged cross-sectional view illustrating the sealing portion of the embodiment of FIG. 2 in final sealing relation.

Referring now to FIG. 4, shown is an enlarged cross-section of the coupling at completion of the joint. As the joint is tightened to approximately 30 foot-pounds of torque (for a 20 thread per inch (TPI) connection), the pointed end of edge 26 of groove 22 slides down the outward slope 18 of annulus 12, expanding in diameter and scraping the slope, thereby forming a seal as the metals scrape against each other. In other embodiments in which the components are differently dimensioned, axial groove 22 may be contracted rather than expanded. It is to be understood that the torque level may be increased or reduced using differently pitched connections. For example, the approximate torque required may be reduced in half by using a 40 pitch thread, or doubled using 10 pitch thread. The inventor has determined that the actual contact force involved is on the order of approximately 22,600 pounds of force (reduced by the torque absorbed in friction as the fitting is tightened). In another embodiment in which the connections use a differential thread of 34 and 36 pitch, the approximate torque required may be about 1 foot-pound.

At whatever the desired torque level, the pointed end of edge 26 may be in contact with both deformed annulus 12 and mating surface 11 of body 10 upon conclusion of the joining. The deformation of annulus 12 and edge 26 stops at some point after contact when the surface area of the joint is high enough to support the force applied in joining the coupling.

Any imperfections in the metal seal large enough to escape the deformation caused by the sliding of the two metal surfaces are sealed by the extruding portions of seal ring 30 between the surfaces. The remainder of seal ring 30 forms a secondary backup seal due to the hysteresis of the material as it is deformed. Thus upon completion of joining, a primary metal to metal seal is effected, which is supported by secondary seal ring 30, via extruded portions 32 and 34, as well as the portion remaining within groove 22.

Figure 5:
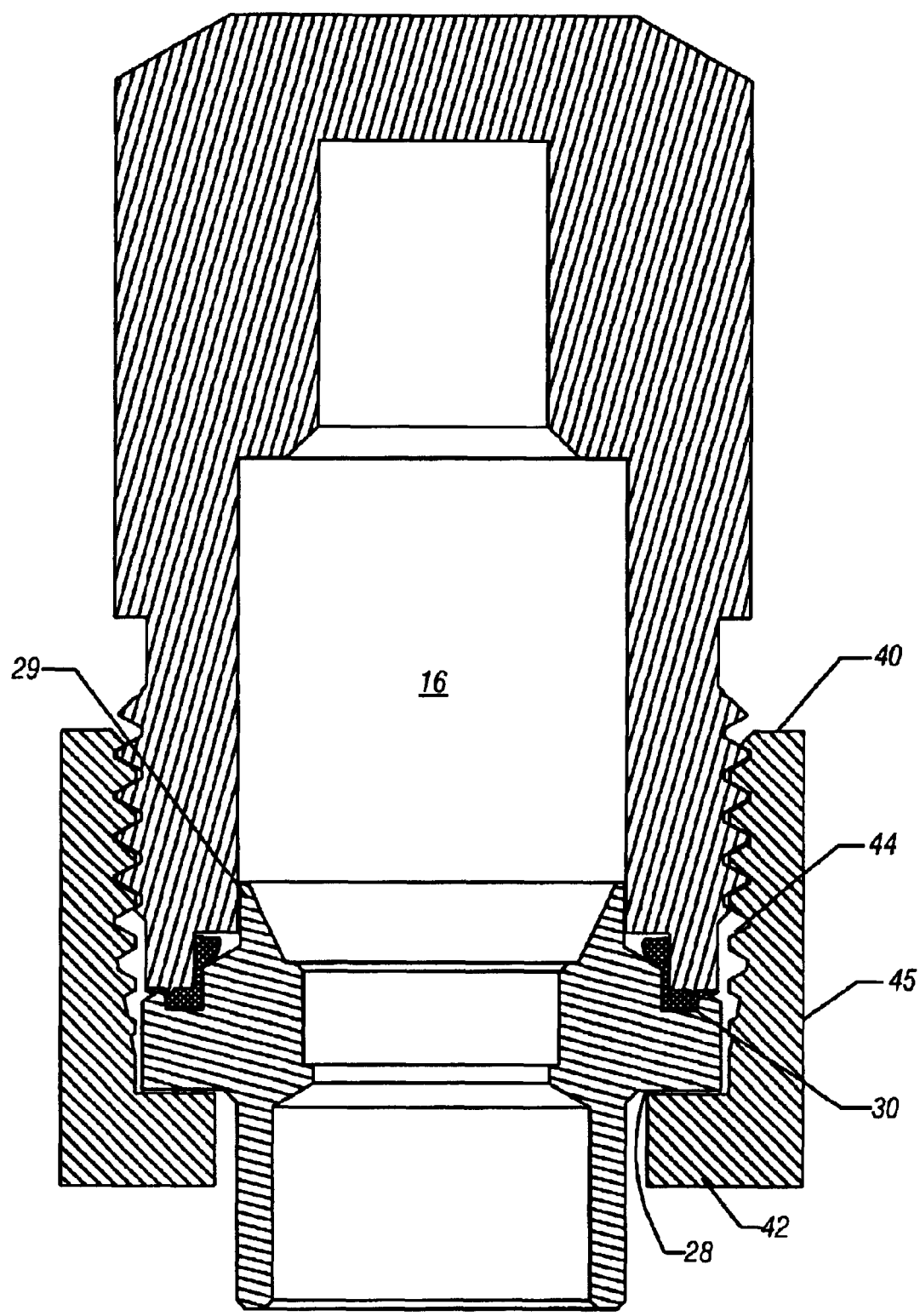
FIG. 5 is a cross-sectional view of a coupling with a tensioning mechanism in accordance with one embodiment of the present invention.

FIG. 5 shows a cross section of the completed coupling, including collar or nut 40 adapted thereon as a tensioner. While shown in FIG. 5 as a threaded nut, it is to be understood that the tensioner may take other forms in different embodiments. As shown in FIG. 5, adapter 20 is held to body 10 by nut 40 which has an inwardly facing flange ring 42 at one end and internal threads 44 at the opposite end. The radially outward surface 45 of nut 40 may be hexagonal to accommodate manipulation with standard hand tools. Flange ring 42 engages a retaining surface 28 of adapter 20 and is rotatable with respect thereto while collar threads 44 engage body threads 15. As nut 40 is rotated, adapter 20 is pulled into correct concentric alignment with body 10 and the leading end 29 of adapter 20 engages channel 16 of body 10. As nut 40 is rotated further, the desired axial position of adapter 20 with respect to body 10 may be achieved.

Figure 6:
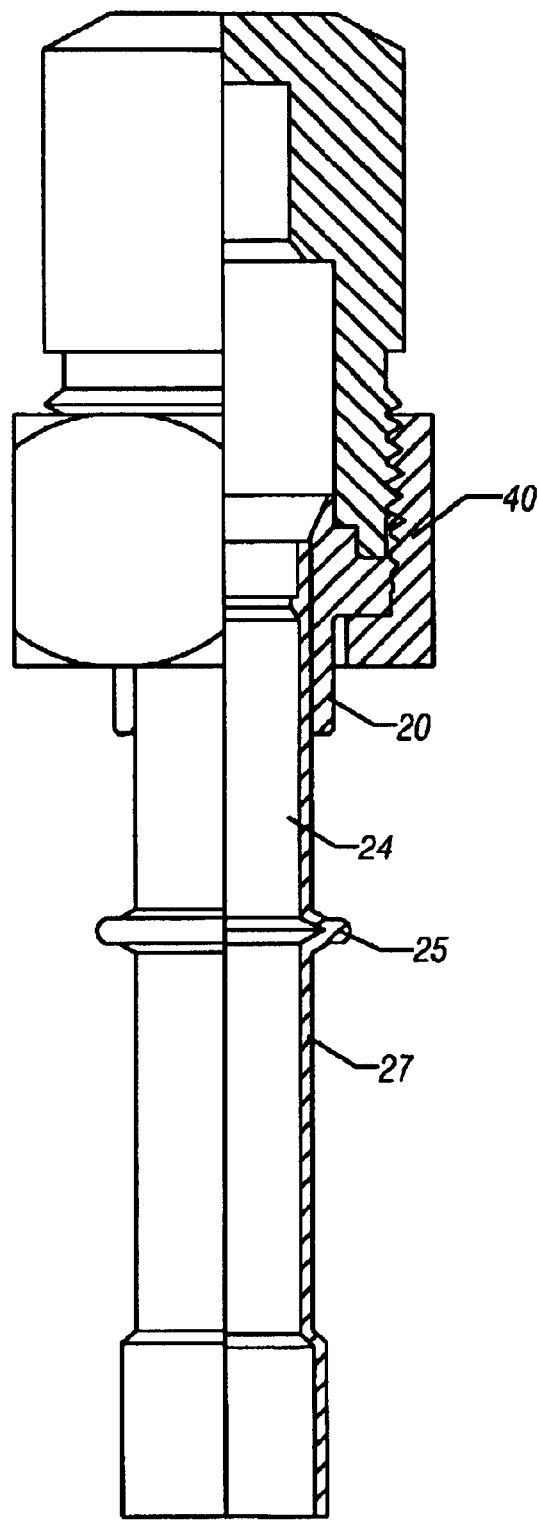
FIG. 6 is a cross-sectional view of an adapter assembly in accordance with one embodiment of the present invention.

Referring now to FIG. 6, shown is a partial cross-section of a consolidated adapter assembly in accordance with one embodiment of the present invention. For ease of reference, FIG. 6 is shown without certain components of the present invention, such as the seal ring, annulus, and axial groove. However, it is contemplated that such a consolidated adapter assembly may be used with the embodiments of the present invention discussed above. The adapter assembly includes adapter 20 with conduit 24 extending therefrom. As shown in FIG. 6, conduit 24 includes an assembly retainer 25. The retainer 25 may be used to hold nut 40 together with adapter 20. Thus retainer 25 permits a consolidated adapter assembly to be created. In other words, retainer 25 maintains nut 40 in substantial axial communication with adapter 20 and conduit 24 prior to its placement in a system or coupling. Such a consolidated assembly is desirable for delivery and ease of installation, as nut 40 is already in the proper location with respect to adapter 20 and conduit 24.

In one embodiment, a consolidated adapter assembly may be constructed as follows. Conduit 24 may be joined to adapter 20 by conventional means such as brazing or welding. Then, nut 40 is placed around conduit 24 and adapter 20. Finally, conduit 24 is placed within a crimping die in order to form the desired retainer at the selected axial distance from adapter 20. In various embodiments, the retainer may be located from flush to the back end of adapter 20 to any point short of the lower end of conduit 24. In preferred embodiments, retainer 25 is located within approximately two inches of the lower end of adapter 20, and in one preferred embodiment, retainer 25 is located directly below adapter 20. In various embodiments, the retainer 25 may be a protrusion of generally cylindrical shape, which may extend in various dimensions from the otherwise substantially uniform wall 27 of the conduit 24, which may be made of annealed copper in one embodiment. In certain embodiments, the retainer 25 may extend between about 0.15 to 0.175 inches in diameter from wall 27.

Figure 7:
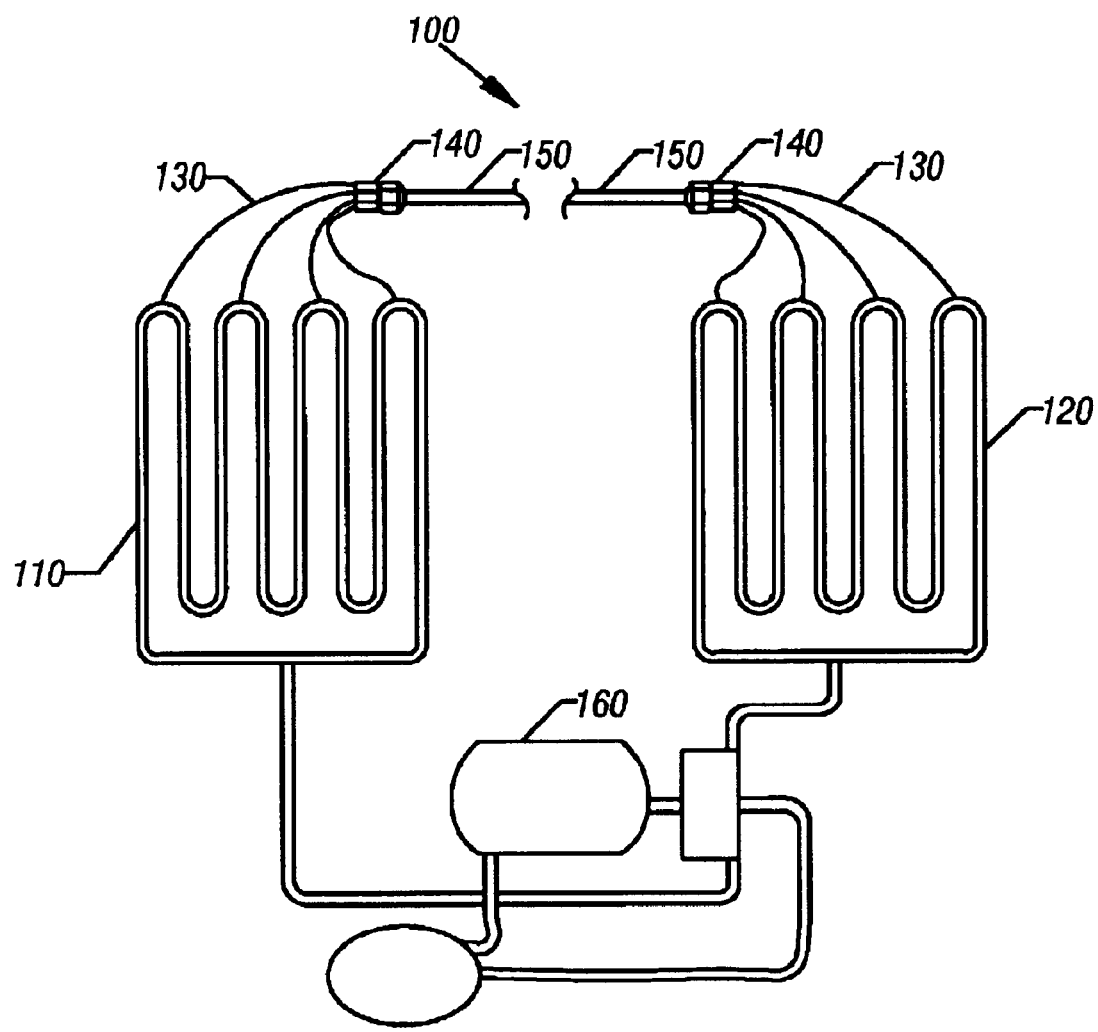
FIG. 7 is a schematic diagram of a system in accordance with one embodiment of the present invention.

FIG. 7 is a schematic diagram of a system 100 in accordance with the present invention. System 100 may be, for example, a heat pump. The system 100 includes a first coil 110 and a second coil 120, which may be evaporator and condenser coils, respectively. Connected to each of the coils is a plurality of tubes 130 which terminate in a valve 140 connected to tubing 150. The embodiments of the present invention discussed above may be used to couple tubing 150 to tubes 130 via valves 140. It is to be understood that system 100 may include many other typical components well known to those of skill in the art but not needed for understanding of the present invention, such as compressor 160, for example. In addition to such a heat pump, it is to be understood that embodiments of the present invention may be used with other refrigeration systems such as air conditioners, cooling towers and the like.

In one embodiment designed for connecting, for example, ⅜ inch conduits, seal ring 30 may be generally circular with a substantially rectangular cross section having a width of approximately 0.040 to 0.060 inches and a depth of between approximately 0.040 and 0.060 inches. The width of groove 22 may closely match these width dimensions, while the depth of groove 22 may vary from slightly smaller than the above stated depths to slightly larger than them, particularly where the groove is formed in an angled portion of adapter 20. However, as can be appreciated, the cross section of groove 22 and seal ring 30 may be varied to include appropriate other shapes. For example, and without limitation, seal ring 30 may be circular, oblong or triangular in cross section. The seal cavity may also have various cross-sectional shapes which may function adequately for various seal shapes.

As shown in FIG. 1, for example, body 10 may be dimensioned so that when in coupling relation to adapter 20, annular wall 13 is situated radially outwardly from inner edge 23 of groove 22 and inwardly from outer edge 26 of groove 22. More so, annulus 12 may be positioned on mating surface 11 so that it contacts outer edge 26 during joining. In certain embodiments, annulus 12 may be between approximately 0.008 to 0.012 inches wide and between approximately 0.007 to 0.010 inches in depth. Also, groove 22 of adapter 20 may be formed in an angled portion of the adapter having an angle of between about 45 and 60 degrees with respect to the longitudinal axis.

In one preferred embodiment, the adapter, body, and collar may be all constructed of brass. In the preferred embodiment designed for connecting, for example, ⅜ inch outside diameter conduits, the body may be manufactured from ¾ inch hexagonal stock, the collar may be manufactured from 15/16 inch hexagonal brass stock, and the adapter may be manufactured from 11/16 inch brass rod. The threads on the exterior of the body and the interior of the collar may be ¾-20-2A, for example. In such an embodiment, the approximate torque required for joining is about 30 foot-pounds.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a body with a first end and a second end, the second end having an annular protrusion extending therefrom;
   an adapter having an axial groove with an outward edge, the axial groove being dimensioned so that the outward edge contacts the annular protrusion of the body while the body is coupled to the adapter, wherein the outward edge and the annular protrusion are deformed when the body is coupled to the adapter;

a seal ring disposed within the axial groove; and a tensioner to couple the body to the adapter.

2. The apparatus of claim 1, wherein the seal ring comprises virgin polytetrafluoroethylene.

3. The apparatus of claim 1, wherein the second end of the body contacts the adapter when coupled to form a primary metal to metal seal.

4. The apparatus of claim 3, wherein the seal ring forms a secondary seal when the body and the adapter are coupled.

5. The apparatus of claim 4, wherein the secondary seal comprises a first extruded portion and a second extruded portion.

6. The apparatus of claim 5, wherein the axial groove is radially modified by the annular protrusion.

7. The apparatus of claim 3, wherein the primary metal to metal seal comprises a sliding seal.

8. The apparatus of claim 1, wherein the axial groove is deformed during coupling of the body to the adapter.

9. An apparatus comprising:

a body with a first end and a second end, the second end having an annular surface with an annulus extending therefrom;

an adapter having an axial groove with an outward edge, the axial groove being dimensioned so that the outward edge contacts the annulus during coupling of the body to the adapter, wherein the outward edge and the annulus are deformed when the body is coupled to the adapter;

a seal ring disposed within the axial groove; and a tensioning mechanism to couple the body to the adapter.

10. The apparatus of claim 9, wherein the seal ring comprises virgin polytetrafluoroethylene.

11. The apparatus of claim 9, wherein the second end of the body contacts the adapter when coupled to form a primary metal to metal seal.

12. The apparatus of claim 11, wherein the seal ring forms a secondary seal when the body and the adapter are coupled.

13. The apparatus of claim 12, wherein the secondary seal comprises a first extruded portion and a second extruded portion.

14. The apparatus of claim 9, wherein the axial groove is formed in an angled portion of the adapter.

15. The apparatus of claim 9, wherein the axial groove is deformed during coupling of the body to the adapter.

16. A system comprising:

a first coil and a second coil;

a first plurality of tubes extending from the first coil;

a second plurality of tubes extending from the second coil; and a first coupling to join the first plurality of tubes to a first conduit, the first coupling comprising a body with a first end coupled to the first plurality of tubes and a second end, the second end having an annular protrusion extending therefrom, an adapter having an axial groove with an outward edge, the axial groove being dimensioned so that the outward edge is deformed by the annular protrusion of the body when the body is coupled to the adapter, a seal ring disposed within the axial groove, and a tensioner to couple the body to the adapter.

17. The system of claim 16, further comprising a compressor coupled to the first and second coils.

18. The system of claim 16, wherein the second end of the body contacts the adapter when coupled to form a primary metal to metal seal.

19. The system of claim 18, wherein the seal ring forms a secondary seal when the body and the adapter are coupled.

* * * * *